May 10, 1960   G. P. McCORD   2,936,017
ALL RUBBER TUBELESS TIRE VALVE
Filed Oct. 10, 1957
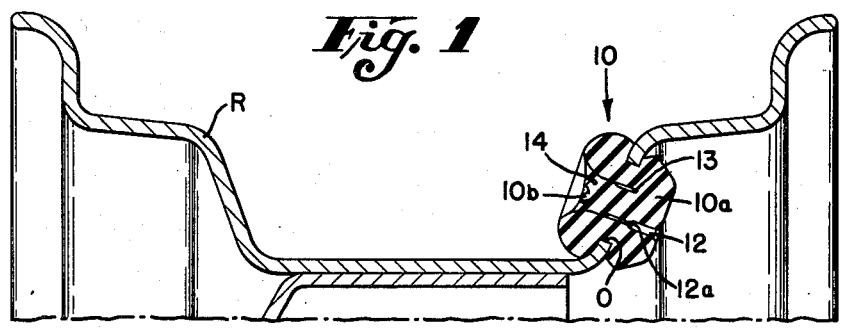
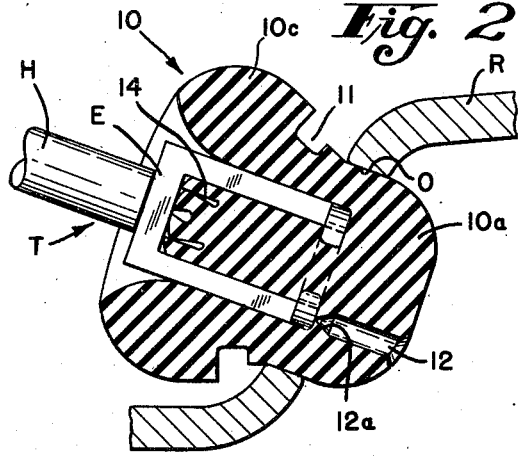
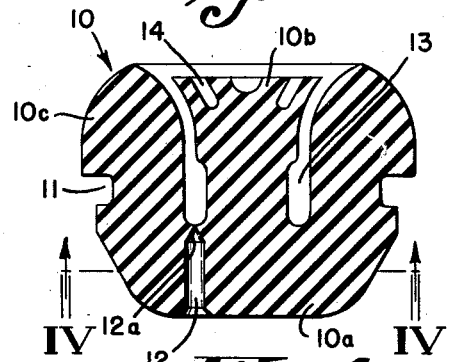
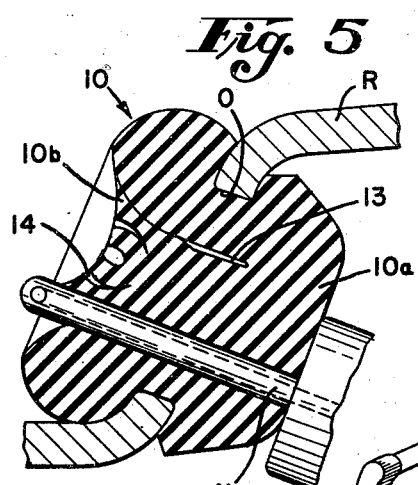
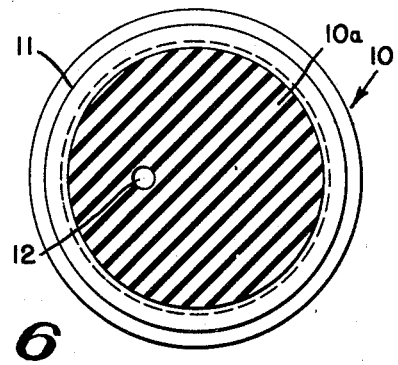
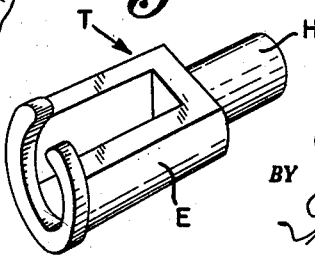
INVENTOR.
GEORGIE P. McCORD
BY
Irvin M. Lewis
ATTORNEY.

United States Patent Office 2,936,017
Patented May 10, 1960

2,936,017
ALL RUBBER TUBELESS TIRE VALVE

Georgie P. McCord, Oaklandon, Ind., assignor to United States Rubber Company, a corporation of New Jersey Application October 10, 1957, Serial No. 689,279

5 Claims. (Cl. 152—427)

This invention relates to improvements in valves. In particular, it relates to a one-piece, all rubber valve of the type having a self-closing inflating passage through which an elongated, hollow inflating needle may be inserted to effect inflation of an inflatable article with which the valve is used.

In the valve of the present invention the inflating passage extends from the outer end of the valve to an annular recess which extends inwardly from the inner end of the valve and, the passageway and the annular recess are formed in the valve at the time the valve is molded.

A valve so molded is more rugged and less susceptible to damage when the inflating needle is inserted or withdrawn than valves of this general type heretofore prepared which had slit type passageways formed by cutting through the valves after the valves were molded. The present invention contemplates having the recessed portion lie inside the tire rim so that the pressure within the tire may be utilized to further assist in sealing the valve opening.

The invention is concerned, in one of its more specific aspects, with providing a valve structure which will facilitate installation of the valve in the usual valve stem opening in a tubeless tire rim and which will facilitate insertion of an inflating needle therethrough during inflation of the tire. The invention is also concerned with effectively sealing the valve in the valve stem opening and effectively sealing the inflating passage through the valve when the inflating needle is withdrawn.

While the valve of the invention is primarily intended to be used with the rim for a tubless tire and is described hereafter by reference to such use, it will be apparent that this valve has utility in other environments where valves of this general type are used.

It is therefore an object of this invention to provide an improved all rubber type valve.

Another object of this invention is to provide a completely molded all rubber type valve which is rugged and durable and which is less susceptible to damage during insertion or withdrawal of an inflating device.

Another object of this invention is to provide an all rubber type valve which is readily sealable by the pressure of air within the tire when mounted in the tire rim.

Other objects and advantages of the invention will become apparent from the following description when read in conjunction with the accompanying drawing wherein:

Fig. 1 is a sectional view of a rim for a tubeless tire showing the valve of the invention installed in the usual valve stem opening through the rim;

Fig. 2 is an enlarged sectional view of the valve and a portion of the rim during installation of the valve in the valve stem opening through the rim;

Fig. 3 is a sectional view of the uninstalled valve;

Fig. 4 is a sectional view taken along line IV—IV of Fig. 3;

Fig. 5 is a sectional view of the valve and a portion of the rim with the valve completely installed in the valve stem opening through the rim, and with the inflation needle inserted therethrough; and Fig. 6 is a perspective view of a tool for installing the valve in the valve stem opening of a tire rim.

Referring to the drawing and in particular to Figs. 1, 3 and 4, the valve of the invention, generally designated by reference numeral 10, consists of a resilient rubber grommet having a circumferentially extending groove 11 formed in the outer surface thereof intermediate its ends into which the edge of a tubeless tire rim R surrounding the usual valve stem opening O seats when the valve is installed in the opening O.

The base diameter of the groove 11 is slightly larger than that of the diameter of the valve stem opening O and the width of the groove 11 is preferably slightly smaller than the rim thickness so that when the valve is installed in the valve opening O the resilient rubber surrounding the groove 11 will be placed under compression thereby providing effective sealing between the valve and rim.

An axially extending passageway 12 is molded into the outer end 10a of the valve to accommodate an inflating needle N, as is shown in Fig. 5. Because the passageway is molded rather than slitted, the possibility of damage to the valve, normally caused by the insertion and withdrawal of the inflating needle N, is obviated. Passageway 12 has a tapered inner end 12a which communicates with an annular recess 13 which extends from the inner end of the valve inwardly beyond the groove 11. The portions of the valve which define the base of the recess 13 provide a rounded surface that is well down within the valve where pressure can be applied to push the valve into the rim opening O by use of a tool T, as shown in Fig. 2. It will be apparent that in the absence of the recess 13, an attempt to push the valve by application of pressure to the inner end of the valve would result in mushrooming of the valve, thereby making it very difficult, if not impossible, to install the valve in the valve opening O. By reason of the provision of the recess 13, the pressure used in installing the valve is applied well inwardly of the outer end 10a thereof so that the valve is, in effect, pulled into the valve opening O by the end of the tool T.

As best shown in Fig. 6, the tool T, for inserting the valve 10 in the valve stem opening O, includes a handle portion H and a hollow end portion E which is adapted to fit over and around the center portion 10b of the valve 10 as shown in Fig. 2. The open side of the end portion E facilitates removal of the tool from the valve after insertion of the valve in the rim opening O.

As can be best seen in Fig. 3, the recess 13 is preferably flared outwardly adjacent the inner end of the valve. The valve is installed in the rim opening O with the inner end located on the inside of the rim. During installation, the inner end portion 10c elongates but the inner portion 10b does not. When the installing tool T is removed, the opposed walls of the flared portion of the recess 13 close up as shown in Fig. 5, thereby sealing the valve against the passage of air therethrough. To further insure that the inner portion 10b conforms to the outer portion 10c when the valve is installed and the tool T removed, a second, much shorter, annular recess 14, Fig. 4, is provided radially inwardly of the recess 13. Because the recessed portion of the valve is located within the rim, the pressure of the air in the tire further assists in causing the flared portion of the recess 13 to sealably engage the outer wall portion of the recess.

In addition to the previously described function of the recess 13, the recess 13 also serves to eliminate or substantially minimize transmission of the compressive forces created in the valve beneath the groove 11 to the portion 10b surrounding the passageway 12 so that the inflating needle may be easily inserted through this portion of the passageway 12. Preferably, the recess 13 is enlarged over that portion thereof that extends within the groove 11, to thereby further insure a minimum transmission of the compressive force to the rubber surrounding the passageway 12. It will be appreciated that the compressive forces are greater adjacent the groove 11.

From the above description, it can be seen that there is provided an improved all rubber valve. The recess 13 facilitates the installation of the valve by permitting pressure for inserting the valve into the rim opening O to be applied near the outer end of the valve. The recess 13 also minimizes the transmission of the compressive forces created by the pressure of the edge of the rim against the base of the groove 11, thereby facilitating the insertion of an inflating needle through the inflating passageway 12. The passageway 12 being molded minimizes the effects caused by the insertion and withdrawal of an inflating needle. Further, since the recess 13 lies within the rim when the valve is installed thereon, the tire pressure will aid in creating a further seal of the valve over and above the sealing effect created by the elongation of the valve when inserted in the rim opening O.

The term "rubber" is used in this description and in the claims in its generic sense to denote natural rubber, synthetic rubber, and blends thereof.

While a certain embodiment of the invention has been shown and described, it is to be understood that this is for the purpose of illustration only and that changes and modifications can be made therein without departing from the spirit and scope of the invention.

Having thus described my invention, what I claim and desire to protect by Letters Patent is:

1. A valve comprising a resilient rubber grommet having a circumferentially extending groove formed in the outer surface thereof intermediate its ends, an annular recess formed in one end thereof and extending inwardly from the said end past the said groove and an inflating passageway extending inwardly from the opposite end thereof and communicating directly with the recess whereby an inflating needle can readily penetrate said passageway and said annular recess for the purpose set forth.

2. A valve comprising a resilient rubber grommet having a circumferentially extending groove formed in the outer surface thereof intermediate its ends, an annular recess formed in one end thereof and extending inwardly from said end past the groove, an inflating passageway extending inwardly from the opposite end thereof to the recess and communicating directly therewith whereby an inflating needle can readily penetrate said passageway and said annular recess, and a second relatively shorter annular recess formed in the said one end thereof and surrounded by the first recess.

3. A valve comprising a fully molded resilient rubber grommet having a circumferentially extending groove formed in the outer surface thereof intermediate its ends, an annular recess formed in one end thereof and extending inwardly from the said end past the groove, the annular recess being flared outwardly toward the said one end of the grommet, a formed inflating passageway extending inwardly from the opposite end thereof to the recess and communicating directly therewith whereby an inflating needle can readily penetrate said passageway and said annular recess, and a second relatively shorter annular recess formed in the said one end of the grommet, the said second recess being surrounded by the first recess and concentric therewith.

4. A valve for mounting on a tire rim comprising a fully molded resilient rubber grommet having a circumferentially extending groove formed in the outer surface thereof intermediate its ends, an annular recess formed in one end thereof that is adapted to be located within a tire mounted on said rim, the said recess being flared outwardly toward the said end and extending inwardly past the groove, an inflating passageway formed in the grommet extending inwardly from the opposite end of the grommet to the recess and communicating directly therewith whereby an inflating needle can readily penetrate said passageway and said annular recess, and a second relatively shorter recess formed in the said one end of the grommet surrounded by the first recess and concentric therewith.

5. A valve for mounting on a tire rim comprising a fully molded resilient rubber grommet having a circumferentially extending groove formed in the outer surface thereof intermediate its ends, an annular recess formed in one end thereof that is adapted to be located within a tire mounted on said rim to provide added sealing when subjected to air pressure within the tire, the said recess being flared outwardly toward said end and extending inwardly therefrom past the groove and an axially extending inflating passageway formed in the grommet and extending from the opposite end of the grommet to the recess and communicating directly therewith whereby an inflating needle can readily penetrate said passageway and said annular recess.

References Cited in the file of this patent

UNITED STATES PATENTS

| 2,634,785 | Tubbs | Apr. 14, 1953 |
| 2,769,476 | Herzegh et al. | Nov. 6, 1956 |

FOREIGN PATENTS

| 201,902 | Australia | May 24, 1956 |